(No Model.) 2 Sheets—Sheet 1.

H. RASCH.
BOLTING AND SEPARATING MACHINE.

No. 497,343. Patented May 16, 1893.

Witnesses:
M. F. Boyle
Charles R. Searle

Inventor:
Hermann Rasch
by his attorney
Thomas Drew Stetson (No Model.) 2 Sheets—Sheet 2.
H. RASCH.
BOLTING AND SEPARATING MACHINE.
No. 497,343. Patented May 16, 1893.
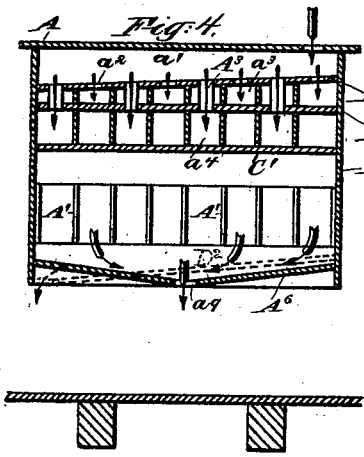
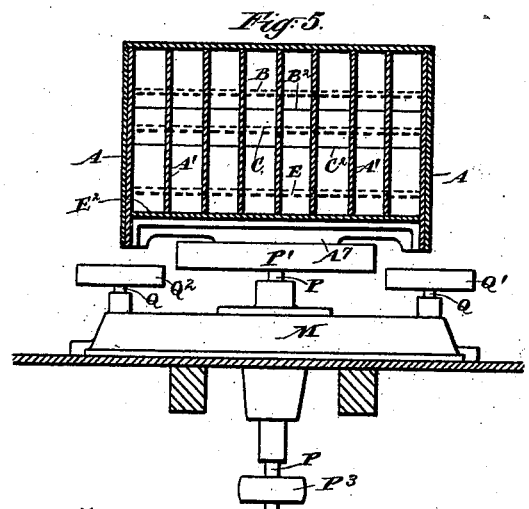
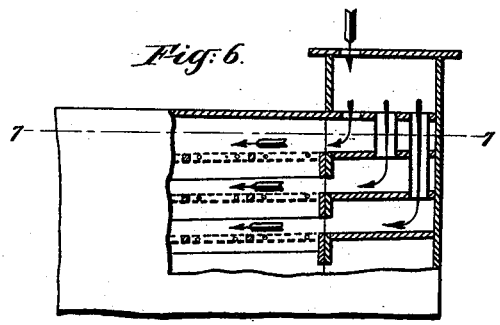
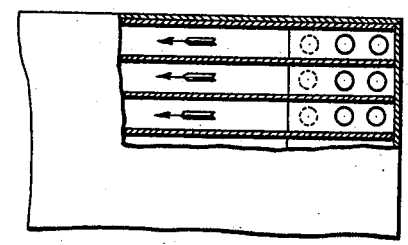
Witnesses:
M. F. Boyle
Charles R. Searle
Inventor:
Hermann Rasch
by his attorney
Thomas Drew Stetson

UNITED STATES PATENT OFFICE.

HERMANN RASCH, OF BERLIN, GERMANY.

BOLTING AND SEPARATING MACHINE.

SPECIFICATION forming part of Letters Patent No. 497,343, dated May 16, 1893.

Application filed December 8, 1892. Serial No. 454,480. (No model.)

*To all whom it may concern:*

Be it known that I, HERMANN RASCH, of Berlin, Prussia, in the Empire of Germany, have invented a certain new and useful Improvement in Bolting and Separating Machines, of which the following is a specification.

The improved machine is intended more particularly for treating the products of flouring-mills, and I will describe it as thus applied.

The material to be treated is received in a continuous stream through a flexible or yielding conduit into a closed case, all parts of which are moved with a gyratory or crank motion, by crank-shafts arranged upright and driven by a steam engine or other suitable power. The closed case contains two or more series of parallel chambers arranged one over another, and having inclined sieves and sieve-bottoms. I provide for distributing the ground corn transversely of the case, so that it shall be supplied about equally to the several parallel divisions, giving each sieve a thin covering and allowing each sieve to work efficiently with the material moving with a gyratory motion down the incline. I provide a return incline in the same case, which is equipped for giving a further treatment to that portion of the material, which, by reason of its coarseness could not pass through the first sieve.

The accompanying drawings form a part of this specification and represent what I consider the best means of carrying out the invention.

Figure 1:
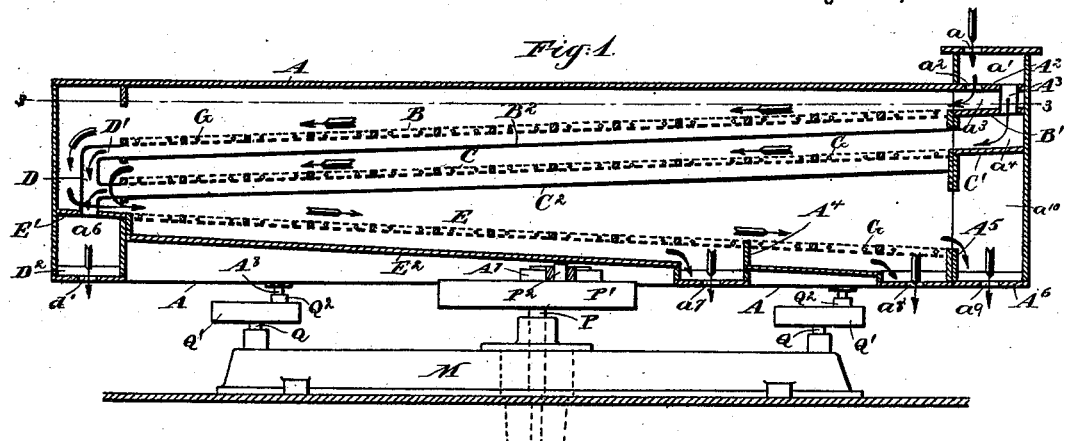
Figure 2:
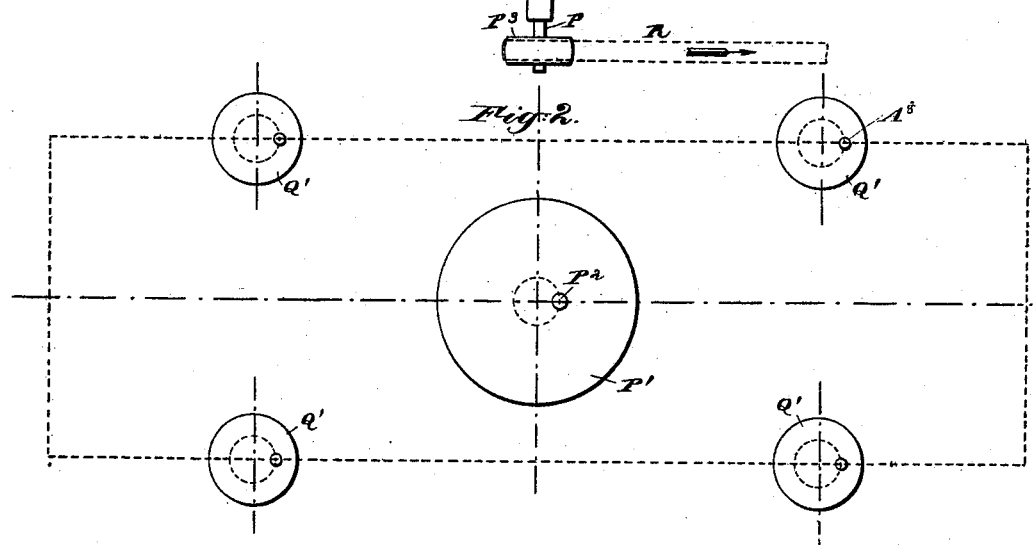
Figure 3:
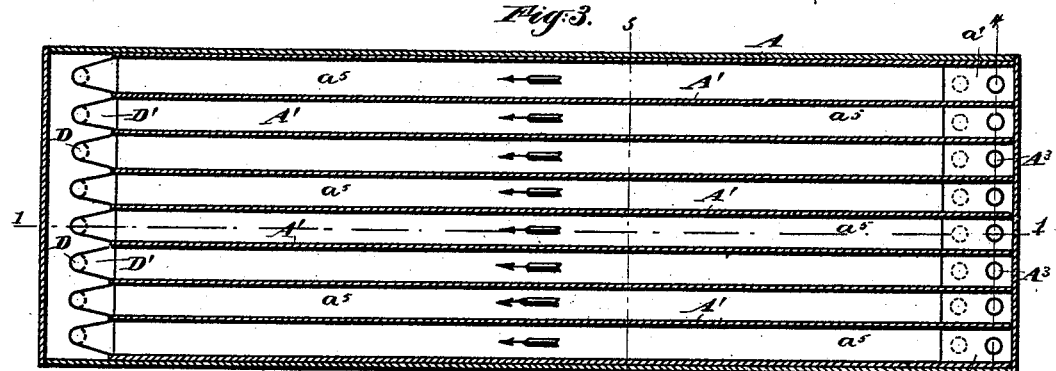

Figure 1 is a side elevation of the lower portion and a longitudinal vertical section through the casing above, on the line 1—1, in Fig. 3. Fig. 2 is a plan view of the operating cranks. The position of the casing which lies above and is operated thereby, is indicated in dotted lines. Fig. 3 is a section on the horizontal line 3—3 in Fig. 1. Fig. 4 is a vertical cross-section on the line 4—4 in Fig. 3. Fig. 5 is an end elevation of the lower portion with a cross-section of the casing on the line 5—5 in Fig. 3. The remaining figures show a modification. Fig. 6 is a side elevation of a part of the casing with a portion in vertical section. Fig. 7 is on the nearly horizontal line 7—7 in Fig. 6.

Similar letters of reference indicate corresponding parts in all the figures where they appear.

In Figs. 1 to 5 inclusive, A is the main body of the casing, inclosing longitudinally inclined sieves, with provisions for receiving and discharging the material. The casing A is divided by vertical partitions A' into a series of longitudinal parallel chambers $a^5$, $a^5$.

B, C, are sieves of suitable fine material, fixed in slightly inclined positions, one above another, extending across between the several partitions A'. Under each is a smooth bottom, correspondingly inclined, the bottom $B^2$ under the sieve B, and the bottom $C^2$ under the sieve C.

The material is received into a chamber $a'$, through a flexible or yielding spout, not shown, communicating with the hole $a$, and falls upon a nearly horizontal partition or shelf $A^2$, extending across and slightly inclined laterally, as clearly indicated in Fig. 4. Holes $a^2$ allow a proper quantity of this material to fall through into a chamber $a^3$, upon a second nearly horizontal partition B', which is inclined to correspond with the sieve B, and as the casing is gyrated, delivers such material uniformly upon such sieve. Tubes $A^3$ lead other portions of the un-treated material down past both the partitions $A^2$ and B', and deliver it into a chamber $a^4$, upon the lowest inclined partition C', from whence it is delivered upon the sieve C. The chamber $a^{10}$ in the lower portion of this end of the apparatus serves as a discharging means for the coarsest grades separated in the course of the sifting, as will appear farther on. The inclined sieves B and C, thus similarly and equally supplied with material, each allow the finest portions to fall through their meshes upon the smooth inclined bottoms $B^2$, $C^2$, along which it traverses and is delivered near the other end of the interior of the casing A, through tapering casings D' into descending pipes D, which deliver it into the transverse chamber $a^6$, having a double inclined bottom $D^2$, which discharges it through a single aperture $d'$, into a bin, not shown. Above this chamber $a^6$ is a nearly horizontal shelf E' inclined in the opposite direction,—toward the receiving end. Co-inciding with this is a third series of sieves E, constructed in all respects like the sieves B and C, except that they are shorter and are inclined in the opposite direction, and for the most efficient work should be somewhat coarser. These sieves E incline continuously and uniformly to the upper edge of a low transverse partition $A^4$. From thence corresponding but preferably still coarser sieves extend to the lower transverse partition $A^5$. The bottom to this lower sieve E is formed by the correspondingly inclined bottom plate $E^2$. The middlings which fail to pass through the sieves B and C fall through the meshes in the sieve E on to the bottom $E^2$, and are discharged through the aperture $a^7$ which may be provided with a flexible spout, not shown, leading the coarse but valuable material to a suitable receptacle, not shown. A still coarser grade falls through the lowest part of the sieve E, upon the lower portion of the bottom $E^2$, beyond the partition $A'$, and is discharged through an aperture $a^8$ and is similarly conveyed away to a separate receptacle. The bran which is too coarse to pass through any sieve is discharged into the bottom $A^6$, and is similarly discharged through an aperture $a^9$.

M is a sufficiently stout and extended bed of cast iron or other suitable material, forming a support for a central and principal upright shaft P, and also for four auxiliary upright shafts Q, distributed as shown. Each shaft carries on its upper end a horizontal wheel which is adapted to engage crank-wise with a suitable bearing on the lower face of the casing A. The construction of these bearings may be varied, so long as they will efficiently impart the required gyratory motion to the casing A and the parts carried therein. I have shown the pin $P^2$ of the central crank as set in the wheel $P'$, and engaging in a close-fitting hole in a stout cross-piece $A^7$ in the bottom of the mid-length of the casing A, and each of the corner wheels $Q'$ as provided with a hollow block $Q^2$, which receives a pin $A^8$ extending downward from the corresponding part of the casing A. The central shaft P is equipped with a pulley $P^3$, which receives a belt R, shown in dotted lines in Fig. 1, impelled by a steam engine or other suitable power, not shown. This rotates the central shaft P so as to give the required gyratory motion to the entire casing A, and its contents, the other cranks Q contributing to support the weight and insuring the correct general position of the casing. There may be gearing or other means of communicating power from the shaft P to the several corner shafts Q, if preferred.

Modifications may be made without departing from the principle or sacrificing the advantages of the invention. I can employ more than the two series of slightly inclined sieves, mounted one above another, as shown at B C in Fig. 1. Figs. 6 and 7 show three such inclined sieves, with provisions for supplying the untreated material equally to each.

There may be any ordinary or suitable provisions for supporting and maintaining in a clear and effective condition the several portions of fine fabric held and agitated as described in the nearly horizontal positions shown, which constitute the sieves. I have shown freely rolling balls G, which, by their motions and gentle blows against the framework of the sieves, induce sufficient jarring action to keep the meshes of the sifting fabric clear.

I claim as my invention—

1. In a separating machine, a horizontal gyrating casing A, having two series of inclined sieves, B, C, and sieve bottoms $B^2$, $C^2$, located one below the other, in combination with the longitudinal vertical partitions $A'$, the two shelves $B'$, $C'$, and the transversely inclined shelf $A^2$, having holes $a^2$, and tubes $A^3$, the whole provided with suitable receiving and discharging means, and arranged as shown so as to distribute the material to the several longitudinal passages $a^5$, and to both series of sieves, all substantially as herein specified.

2. In a separating machine, a horizontal gyrating casing A, having two series of inclined sieves and sieve-bottoms B, $B^2$, and C, $C^2$, located one below the other, in combination with the return sieves E and bottoms $E^2$ therefor, the longitudinal vertical partitions $A'$, the two shelves $B'$, $C'$, and the inclined shelf $A^2$ having holes $a^2$, and tubes $A^3$, the casing being provided with suitable receiving and discharging means, all arranged to serve substantially as herein specified.

In testimony whereof I have hereunto set my hand, at Berlin, this 10th day of November, 1892, in the presence of two subscribing witnesses.

HERMANN RASCH.

Witnesses:
RICHARD DAMES,
KARL GUTOWSKI.